(No Model.)
C. W. HUNT.
HOISTING MACHINERY.
No. 332,803. Patented Dec. 22, 1885.
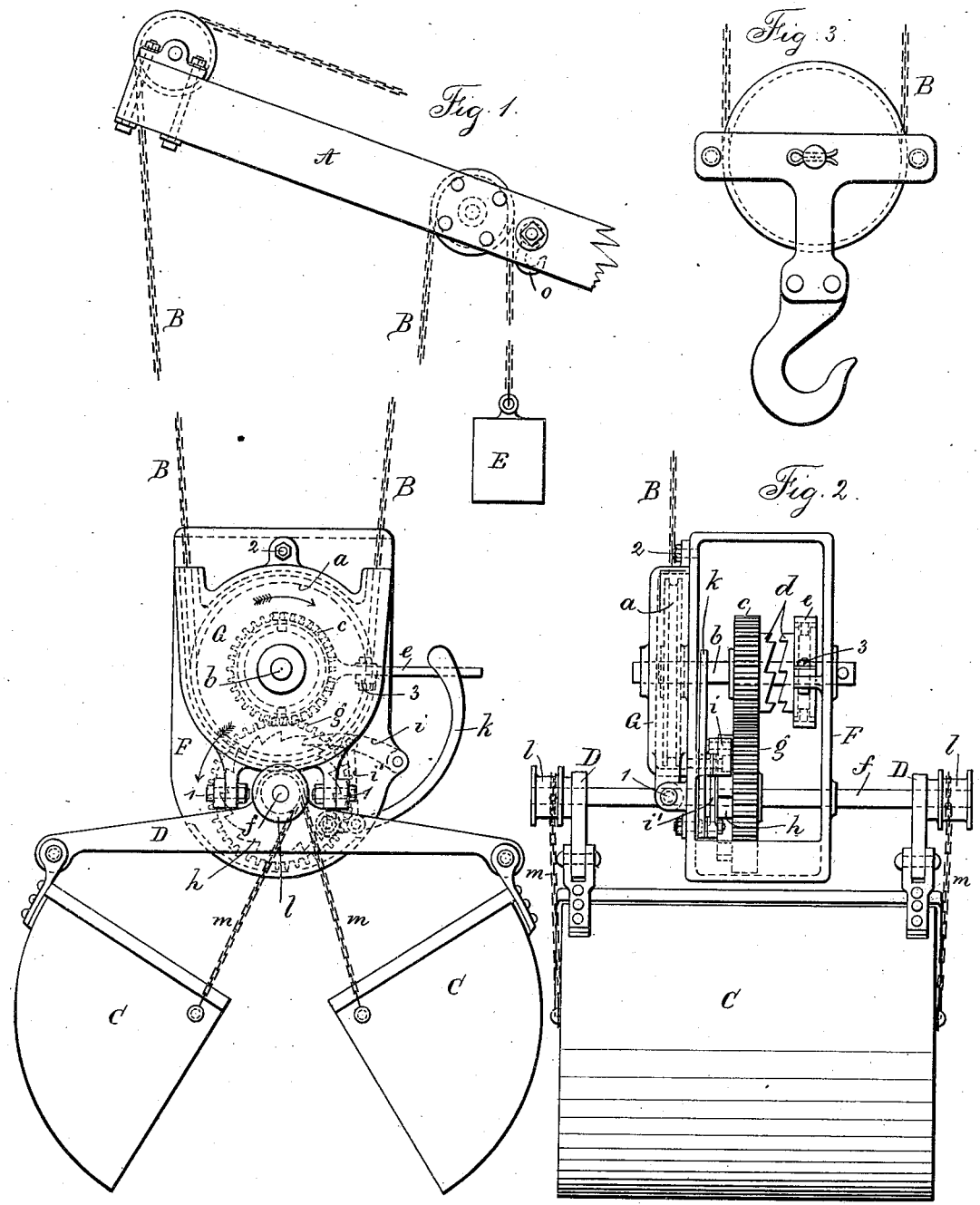
Witnesses:
J. Staib
Chas H. Smith
Inventor
Charles W. Hunt
per Lemuel W. Serrell
Atty

UNITED STATES PATENT OFFICE.

CHARLES W. HUNT, OF WEST NEW BRIGHTON, NEW YORK.

HOISTING MACHINERY.

SPECIFICATION forming part of Letters Patent No. 332,803, dated December 22, 1885.

Application filed April 22, 1885. Serial No. 163,013. (No model.)

*To all whom it may concern:*

Be it known that I, CHARLES W. HUNT, of West New Brighton, in the county of Richmond and State of New York, have invented a certain new and useful Improvement in Hoisting Machinery, and the following is declared to be a description of the same.

This invention is designed as an improvement upon the invention described and claimed in my application for Letters Patent filed January 20, 1885, Serial No. 153,393, and duly allowed January 28, 1885, said application applying broadly to the construction and operation of the hoisting devices.

The present application relates to an apparatus especially designed for use with a single chain or rope that can be detached from the bucket. I employ a single chain, which passes over the pulley-wheels upon the hoisting-boom and around a chain-wheel upon the hoisting mechanism connected with the bucket, and in order to obtain the necessary number of revolutions of this chain-wheel for closing the bucket with the required force the chain is paid out, and the slack taken up by a weight or spring, thus providing an amount of chain which can be drawn upon in closing the buckets. The buckets are connected to a framing which carries the main shaft, upon which are the chain-drums and chains, and upon said main shaft there is a toothed wheel and ratchet, and a frame is connected to said shaft and extends above it. This frame carries a shaft upon which are the chain-wheel, a toothed wheel and clutch, and connected to this frame there is a lever for operating the clutch, and a pawl and lever for operating the ratchet. The chain-wheel has a hinged cover over it, and said cover may be taken off or turned down to remove the chain when it is desired to use an ordinary pulley with said chain.

In the drawings, Figure 1 is an elevation of the bucket and part of the boom. Fig. 2 is a side elevation of the same, and Fig. 3 is an elevation of an ordinary pulley-block.

A represents the boom of the hoisting apparatus; B, the hoisting-chain; C, the bucket; D, the main frames to which the parts of the bucket C are pivotally connected; E, the weight upon the end of chain B. F is the frame through which the main shaft passes, and G is the cover upon the frame F, which cover is hinged or pivoted to lugs upon the frame at 1, and held by bolt 2. This cover G keeps the chain B in place upon the chain-wheel $a$, and it can be turned down or taken off by removing the connecting-bolts when it is desired to detach the chain from the bucket and employ it in connection with an ordinary pulley, such as is shown in Fig. 3. The shaft $b$ is supported in bearings in the frame F, and said shaft carries the chain-wheel $a$, the toothed wheel $c$, and clutch $d$, and the lever $e$, and its yoke end that operates the clutch $d$ is pivoted at 3 upon the frame F. The frames D support the shaft $f$, upon which shaft is the toothed wheel $g$, ratchet-wheel $h$, and chain-drums $l$, and the chains $m$ are connected to the drums $l$ and to the buckets C, respectively. The pawl $i$ and lever $k$ are pivoted to the frame F, and a link, $i'$, connects them, and said pawl $i$, engaging the teeth of the ratchet $h$, serves to hold the buckets together after they have been shut. The toothed wheel $c$ and half the clutch $d$ are made together, and are loose upon the shaft $b$. The other half of the clutch $d$ slides upon a feather upon the shaft $b$, and the parts of the clutch are brought together and engage when the buckets are being closed, and the ratchet-wheel $h$ and pawl $i$ keep the shaft $f$ and chain-drums $l$ from turning back and hold the buckets closed. After the bucket has been closed the clutch $d$ is disengaged to free the chain-wheel $a$, so that it can revolve as a loose pulley in raising the bucket. At this point of the operation the bucket is being raised, and as it reaches its destination a fixed roller or arm, whose position has been prearranged, strikes against and operates the lever $k$, pushing it toward the frame F, the same operation acting upon the link $i'$ to force the pawl $i$ out of the teeth of the ratchet $h$, and so release the bucket, that the weight of the bucket and and its contents will open the bucket and the contents be discharged. Where the chain B is employed with an ordinary pulley, as shown in Fig. 3, the weight E is not needed, and can be hung upon a hook at $o$ upon the boom and be out of the way.

Instead of using the cover G, I may continue the shaft $b$, and support its outer end in a hinged bearing-arm connected with the frame F, and said hinged arm can be removed when it is desired to lift the chain from the chain-wheel.

I claim as my invention—

1. The combination, with the bucket, the main shaft, and the drums and chains for operating the bucket, and a frame connected with the main shaft, of a chain-wheel, a shaft for the same, and the connecting-gearing, said chain-wheel being outside the frame, whereby the chain can be lifted off the chain-wheel without disconnecting any portion of the chain, substantially as set forth.

2. The combination, with the bucket, the main shaft, and the drums and chains for operating the bucket, and a frame connected with the main shaft, of a chain-wheel, a shaft for the same, and the connecting-gearing, said chain-wheel being outside the frame, and a guide or guides whereby the chain is retained in its place, but can be lifted off the chain-wheel without disconnecting any portion of the chain, substantially as set forth.

3. The combination, in a hoisting apparatus, with the frame F, the shaft $b$, and chain-wheel $a$ and chain, of a cover, G, hinged to the frame F and held in place in substantially the manner described, said cover being adapted to be swung out from the frame F, to give access to the chain B, to remove it from the chain-wheel $a$, for the purposes and substantially as set forth.

Signed by me this 17th day of February, A. D. 1885.

CHAS. W. HUNT.

Witnesses:
GEO. T. PINCKNEY,
HAROLD SERRELL.